Aug. 19, 1947.  C. A. CRACRAFT  2,425,787
STABILIZER FOR MOTOR DRIVEN VEHICLES
Filed Jan. 26, 1946
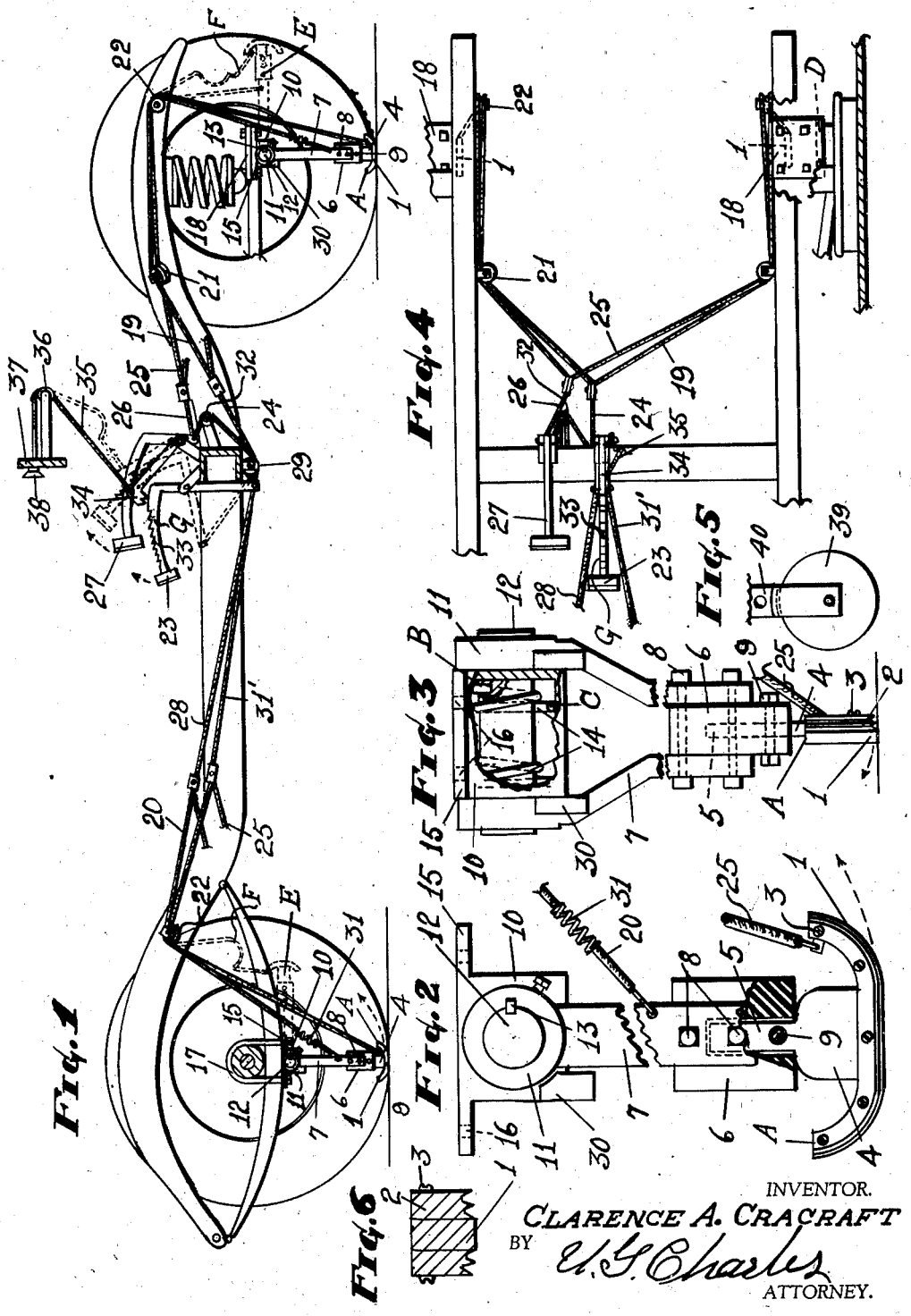
INVENTOR.
CLARENCE A. CRACRAFT
BY
ATTORNEY.

Patented Aug. 19, 1947

2,425,787

UNITED STATES PATENT OFFICE 2,425,787

STABILIZER FOR MOTOR-DRIVEN VEHICLES

Clarence A. Cracraft, Peabody, Kans.

Application January 26, 1946, Serial No. 643,629

6 Claims. (Cl. 188—5)

My invention relates to stabilizers for motor-driven vehicles, the principal object of which is to stabilize the vehicle against side skidding on slippery roads.

A further object of my invention is to provide a stabilizer that will function as a brake for the vehicle in coaction with the vehicle standard brake.

A still further object of my invention is to provide a stabilizer that is automatic in its function against side skidding, whereby the cleaving element is disengaged when the vehicle is moving normally in straight alignment.

A still further object of my invention is to provide a stabilizer rockably carried by the vehicle and means to disengage the stabilizer, and the said means to cause engagement thereof at an instant warning with respect to side skidding.

A still further object of this invention is to manufacture a stabilizer as an accessory to be applied to standard makes of motor vehicles, also inexpensive to construct and efficient in its performance.

These and other objects will hereinafter be more fully explained, reference being had to the accompanying drawings, forming a part of this specification, and in which like characters will apply to like parts in the different views.

Referring to the drawings:

Fig. 1 is an inside longitudinal view of the chassis and wheels of a motor-driven vehicle, illustrating the position of the front and rear stabilizers.

Fig. 2 is an enlarged side view of a stabilizer in its operative position.

Fig. 3 is a rear view of Fig. 2.

Fig. 4 is a fragmentary plan view of the cable control and chassis.

Fig. 5 is a modification or substitution for the runner.

Fig. 6 is an enlarged cross section of the runner to illustrate the application of the toothed cleaving element, being on each side of the runner.

The stabilizers and controlling means therefor as disclosed in the drawings, each consists of a rockably mounted shoe comprising a runner portion 1 having on one or both sides thereof a removable V-toothed cleaving element 2 secured by cap screws 3. Each end of said runner and cleaving element has an arcuate bend upward as at A, said runner having a shank 4 integrally joined to the runner, intermediate of its ends, said shank having a tongue 5 upwardly extending and integrally joined to the shank at its upper extremity, the tongue adapted to seat in a flexible block 6 that is preferably made of rubber void of excess elasticity, but of such texture as to flex sufficiently to form a cushion, permitting side and twisting movement of the runner and cleaving element later described.

The block 6 is clamped between the lower portion of arms 7 by bolts 8 passing through the block and said tongue, while bolt 9 is a means to brace the lower extremity of the block to snug engagement with the tongue, and is rockable therewith. It will be understood that the apertures in said tongue will be of sufficient diameter over that of the bolts to permit the aforesaid twist and rocking movement of the runner, said arms from the block upward diverging sufficiently to receive an oil tight box 10 therebetween, the terminal upper end of each arm having an eye 11 formed thereon, the eyes being in parallelism to seat on their respective ends on the box, said eyes being in registry with a bore in each end of the box. Through said bores and eyes a pin 12 will engage, functioning as a rockable hanger for the arms, the pin being secured to the eye element by a key 13 which constitutes means whereby said pin will turn with the rocking movement of the arm.

The shoe is rocked downward to engagement with a road bed as shown in Fig. 1 through the medium of a pair of springs 14 wound on the pin, one end of each spring being secured to the pin as at B, while the other ends are secured to the box as at C. The purpose of the box-like structure is to provide an enclosure to protect the rocking members against water, ice, and sediment, said box having a pair of oppositely disposed ears 15, each having a pair of apertures 16 extending therethrough to receive the ends of U-bolts 17 passing therethrough as a clamping means for the box to the springs, the latter being carried by the rear axle, the U-bolts being looped around the axle housing as shown in Fig. 1, while the said box is applied to the front of the vehicle by a plate 18 secured thereto by bolts engaging in the apertures of said ears of the box, and the said plate has a right angle bend as at D positioned in parallelism with the brake backing plate of the front wheel and to which said right angle portion is secured by an appropriate means as carrying means for the front stabilizers, there being one stabilizer adjacent each wheel of the vehicle.

The said stabilizers are adapted to rock forward with respect to the auto's line of travel, and are operated by cables as follows:

To rock each stabilizer to a horizontal plane as shown by dotted lines E in Fig. 1 is accomplished through the medium of a looped cable 19 for the front stabilizers, and a looped cable 20 for the rear stabilizers, said front loops being carried by pulleys 21 and 22, pulley 21 serving to conduct the loop to its respective front stabilizer, and from thence the cable portions are substantially in parallelism to where they engage with said pulleys 22, and from thence downward and rearward to connect with their respective stabilizer as raising means therefor when foot lever 23 is moved forward, it being understood that the loop is connected to said lever below its pivot point as shown in Fig. 1 by a cable link 24 connecting the loop portion to said lever as above stated. It will be understood that the pulleys above referred to are double to be engaged by another loop 25 running in like manner, except the ends of each connect to the forward end portion of the runner, and the last said loop has a link 26 that connects to a brake lever 27 below its pivot point, whereby said brake lever, when rocked forward, causes the last said loop to be tensioned to cause the shoe to toe inward, functioning as a brake, and a similar loop arrangement is on the rear stabilizers, in which case pulleys 22 as applied to the front are not required for the rear loop as the said loop line varies in position from that of the front. The rear loop 20 has a cable link 28 similar to that for the purpose described for the front loop, the said rear link extending forward to engage on a pulley 29, and from thence to the lower free end of the foot lever where the front link connects, whereby the forward movement of said foot lever will carry the links and their respective loops toward each other to rock their respective stabilizers from engagement in the same direction, as heretofore described. When the foot lever is released, the springs at the pivot connection of each stabilizer heretofore described provide means to retract the same to the extent of the cable lengths as normal supporting means therefor during the service of the stabilizer, there being a stop element 30 on each end of the box as an emergency stop for excess strain on the cables. It will be seen that a spring 31 is placed in the loop member 20 adjacent each stabilizer as a shock absorber should either of the stabilizers encounter an obstruction unsurmountable or at least difficult to surmount, at which instant, the stops will take the load when springs 31 stretch.

It will also be seen that the rear loop 25, having a connecting link 31', is arranged to toe-in the rear shoes similar to that arranged for the front shoes, the link being wound on pulley 29, and from thence over an idler 32, connecting with the lower free end of the brake lever, and being secured at the same point where the front toe-in loop link is connected; being so arranged, is means to toe-in both front and rear runners simultaneously.

It will be understood that the toe-in line loops will be slack as shown by dotted lines F in Fig. 1 when the stabilizers are rocked to a horizontal plane. When the stabilizers are rocked to engagement with the road bed, each shoe will maintain a vertical position, at which time the load is imposed on the runner to support the cleaving elements from contact with the road bed with ice or mud contamination, while at the time of a side skid of the vehicle, the runner, as in contact with the road bed will rock side ways sufficient to engage the cleaving element edges, which, in turn, will stabilize the vehicle against skidding, which often terminates in a disastrous upset of the vehicle, and by toeing-in the shoes a counter action is created by the shoes moving toward each other, whereby the tendency of a brake is had to check the vehicle on its normal forward or rearward movement.

As a means to retain the foot pedal when the stabilizers are rocked from engagement, there is arranged a series of notches 33 on the arm G of the foot lever and a pawl 34 to rockably engage the notches, the pawl being released by a cable 35 secured thereto and passing over a pulley 36 rearward of the instrument board 37 and extending therethrough to an appropriate knot 38 to pull said cable.

As a modification for the efficiency of the shoes, there is provided a disc 39 trunnioned on arm 40 and carried by the head in like manner to that of the aforesaid shoe tongue, it being understood that the peripheral face of the disc is at right angles to the sides thereof, the corners being sharp to sever ice or other slippery road bed when rocked as described for the shoe.

In the modification with respect to the shoe construction in Fig. 6, it will be seen that a cleaving element may be placed on each side of the shoe, whereby a side skid of the vehicle will engage a cleaving element of each shoe, and the said cleaving elements may be interchangeable should the outside edge portion of each become worn excessively.

Such other modifications may be made as lie within the scope of the appended claims.

Having fully described my invention, what I claim as new and desire to secure by Letters Patent is:

1. In stabilizers for motor-driven vehicles, in combination with a motor-driven vehicle, a box for each wheel of the vehicle, means to secure the same in spaced relation thereto, arms for each box and means to rockably connect one end of the arms to the box, shoes, and resilient means to connect the same to the other ends of the arms to engage with a road bed, the shoe comprising a runner element and a cleaving element secured to each side of the runner in such a way that the edge of the cleaving elements is spaced upward a short distance from the bottom of the runner so that by rocking movement of the adjustable connecting means the cleaving elements will carry their load ratio of the vehicle to avoid side skidding, and means to rock and retain the arms to an upward disengaged position.

2. In stabilizers for motor-driven vehicles, in combination with a motor-driven vehicle, a hollow box for each wheel of the vehicle, means to secure the box in spaced relation to the wheel, a pair of arms for each box and a spring urged pin extending through the hollow of the box and outward from each end thereof, each outer extension being secured to one of said arms respectively as turning means for the pin, a flexible block secured between the other ends of the arms, a shoe and means to connect the same to the flexible block, the shoe having a runner and a cleaving element secured to one side of the runner a short distance inward from the outer plane of the runner, cable means secured to the arms and means to tension the cable to raise the arms toward a horizontal plane, and a pawl to retain the arms at or near a horizontal position, and another cable element to twist the shoes at the front and rear of the vehicle, said cable element being actuated by the forward movement of a brake pedal of the vehicle to rock the forward ends of the shoes toward the longitudinal axis of the vehicle.

3. In a stabilizer for motor driven vehicles, a hollow box having a pair of oppositely disposed ears integral with the box, each ear having a pair of apertures spaced apart, a pin trunnioned in the box so that each end thereof extends outward from the box, a pair of springs spaced apart and wound on the pin, one end of each spring being secured to the pin and their other ends being secured to the box as retracting means for the pin, an arm keyed to each projecting portion of the pin, said arms converging toward their free ends, a flexible rubber element and means to clamp the same between and adjacent the free ends of the convergent arms, a shoe element comprised of a runner, a shank and a tongue integrally joined, the shank and tongue axially aligned and the runner being at right angles to said shank and tongue, and means to secure the tongue in the block so that the shank is aligned with an axis between the arms longitudinal thereof, and means on the sides of the runner to engage with the road bed when the shoe is rocked from the said arm axis sideways of the runner.

4. In a stabilizer for motor driven vehicles, of the class described comprising a shoe, an arm and a rubber block connecting the shoe to the arm, a box, a pin trunnioned in the box, springs to restrict free turning of the pin, the end of the arm opposite its shoe being secured to the pin as turning means therefor, stops integral with the box against which the arm will engage as turned by the spring.

5. In a stabilizer for motor-driven vehicles, of the class described, comprising a shoe having an elongated runner and a shank integrally joined to the runner intermediate of its ends and extending at right angles therefrom and toothed cleaving elements, means to secure a cleaving element to either side of the runner, a pair of arms and a flexible block element secured to one end of the arms, means to connect the shoe to the flexible means so that the shoe will rock and twist a short distance, a box and means to pivot the other ends of the arms to the box, and springs carried by the box and adapted to coact with the pivot means, the box having stops integrally joined to check the rocking movement of the arms, and the said box having apertured ears to engage U-bolts as connecting means for the box to the axle of a motor-driven vehicle, all as and for the purpose specified.

6. As elements of a stabilizer for motor-driven vehicles, a shank having a tongue extending from one end and integrally joined thereto and an elongated runner transversely crossing and integrally joined to the other end of the shank, each end portion of the runner outwardly extending from the shank being curved upwardly, and a cleaving element coinciding with the contour of the runner with respect to its curvature and portion adjacent the shank, and means to secure the said cleaving element to the runner.

CLARENCE A. CRACRAFT.

REFERENCES CITED

The following references are of record in the file of this patent:

UNITED STATES PATENTS

| Number | Name | Date |
|---|---|---|
| 995,026 | Moore | June 13, 1911 |
| 1,183,107 | Norton | May 16, 1916 |
| 1,147,040 | Norton | July 20, 1915 |

FOREIGN PATENTS

| Number | Country | Date |
|---|---|---|
| 5,019 | Great Britain | Mar. 1, 1906 |